(12) United States Patent
Nyce

(10) Patent No.: US 9,719,537 B2
(45) Date of Patent: Aug. 1, 2017

(54) ADJUSTABLE MOUNTING BRACKET AND SUPPORT

(71) Applicant: Oldcastle Precast, Inc., Auburn, WA (US)

(72) Inventor: Daniel Nyce, Perkasie, PA (US)

(73) Assignee: OLDCASTLE PRECAST, INC., Auburn, WA (US)

( * ) Notice: Subject to any disclaimer, the term of this patent is extended or adjusted under 35 U.S.C. 154(b) by 0 days.

(21) Appl. No.: 14/676,099

(22) Filed: Apr. 1, 2015

(65) Prior Publication Data

US 2015/0276123 A1    Oct. 1, 2015

Related U.S. Application Data

(60) Provisional application No. 61/973,379, filed on Apr. 1, 2014.

(51) Int. Cl.
*F16M 11/00* (2006.01)
*F16B 5/00* (2006.01)
*F16B 2/12* (2006.01)

(52) U.S. Cl.
CPC . *F16B 5/00* (2013.01); *F16B 2/12* (2013.01)

(58) Field of Classification Search
CPC .............. E04B 2/82; E06B 1/045; E06B 7/16
See application file for complete search history.

(56) References Cited

U.S. PATENT DOCUMENTS

| | | | | |
|---|---|---|---|---|
| 3,091,822 A * | 6/1963 | Fiekers | ................ | E04B 1/2608 403/394 |
| 5,330,821 A * | 7/1994 | Lo | ............................. | A47H 2/02 16/94 R |
| 6,119,430 A * | 9/2000 | Nicholls | ................. | E02D 29/02 52/118 |
| 6,666,419 B1 * | 12/2003 | Vrame | ................... | H02G 3/125 248/200.1 |
| 7,137,227 B2 * | 11/2006 | Franz | ........................ | E04B 2/82 248/241 |
| 8,011,628 B1 * | 9/2011 | Suddeth | ................... | H01Q 1/12 248/200 |

* cited by examiner

*Primary Examiner* — Amy Sterling
(74) *Attorney, Agent, or Firm* — Sheridan Ross PC

(57) ABSTRACT

An adjust support bracket for communication with a wall or wall supports is provided. The support provides a mounting surface for plumbing and other fixtures to be mounted within or on a wall or panel. The support comprises first and second sheet metal support panels that connectively sleeve together to form a single fixture support assembly for spanning between, and fastening to, wall framing members, and allows for various fixtures to be securely attached and thereby retained in a secure fixed position.

18 Claims, 7 Drawing Sheets

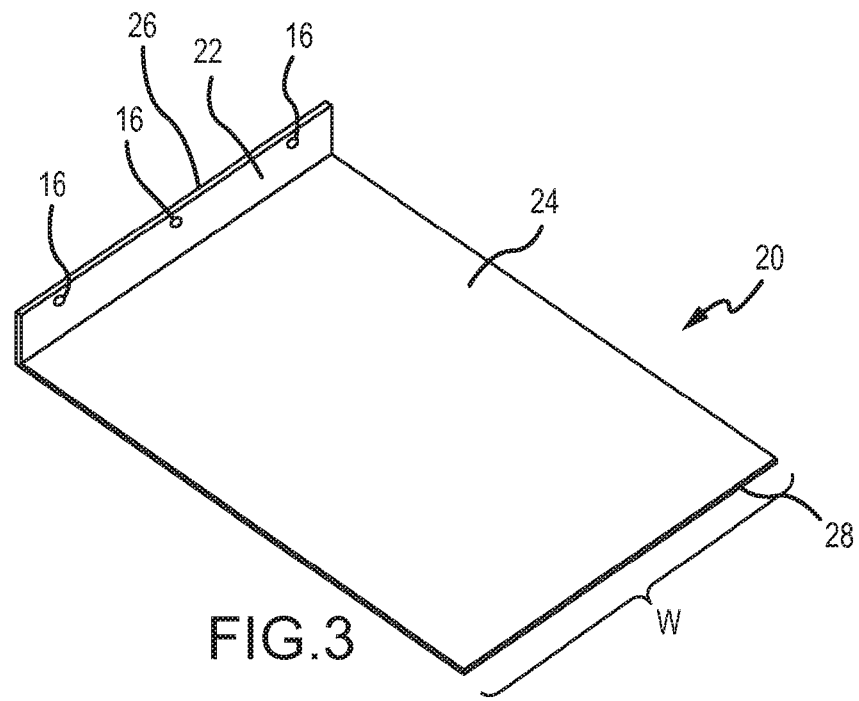
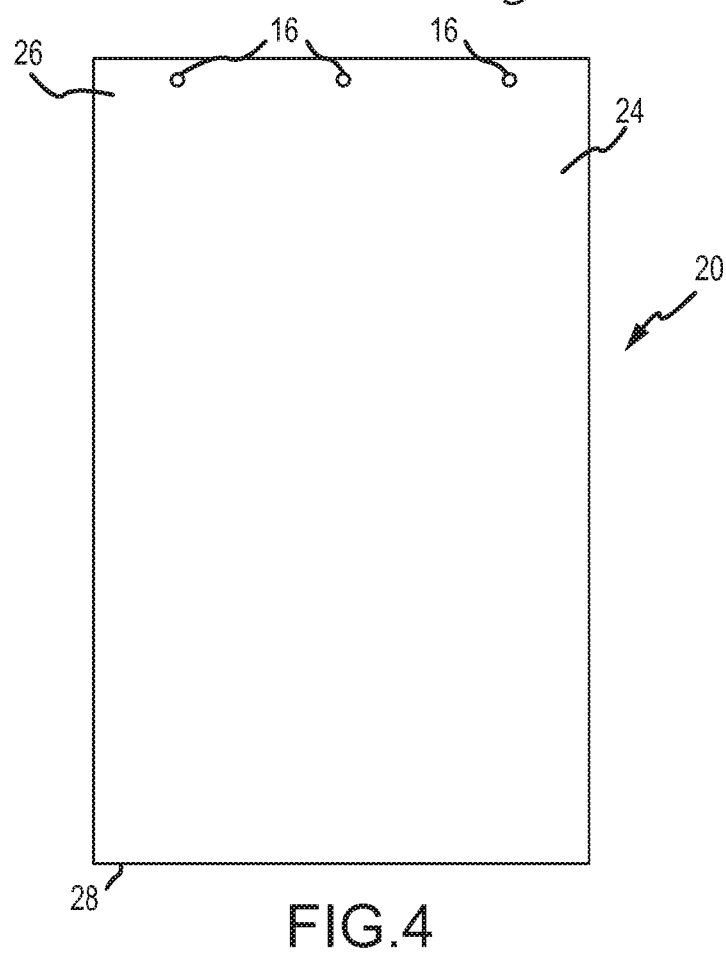

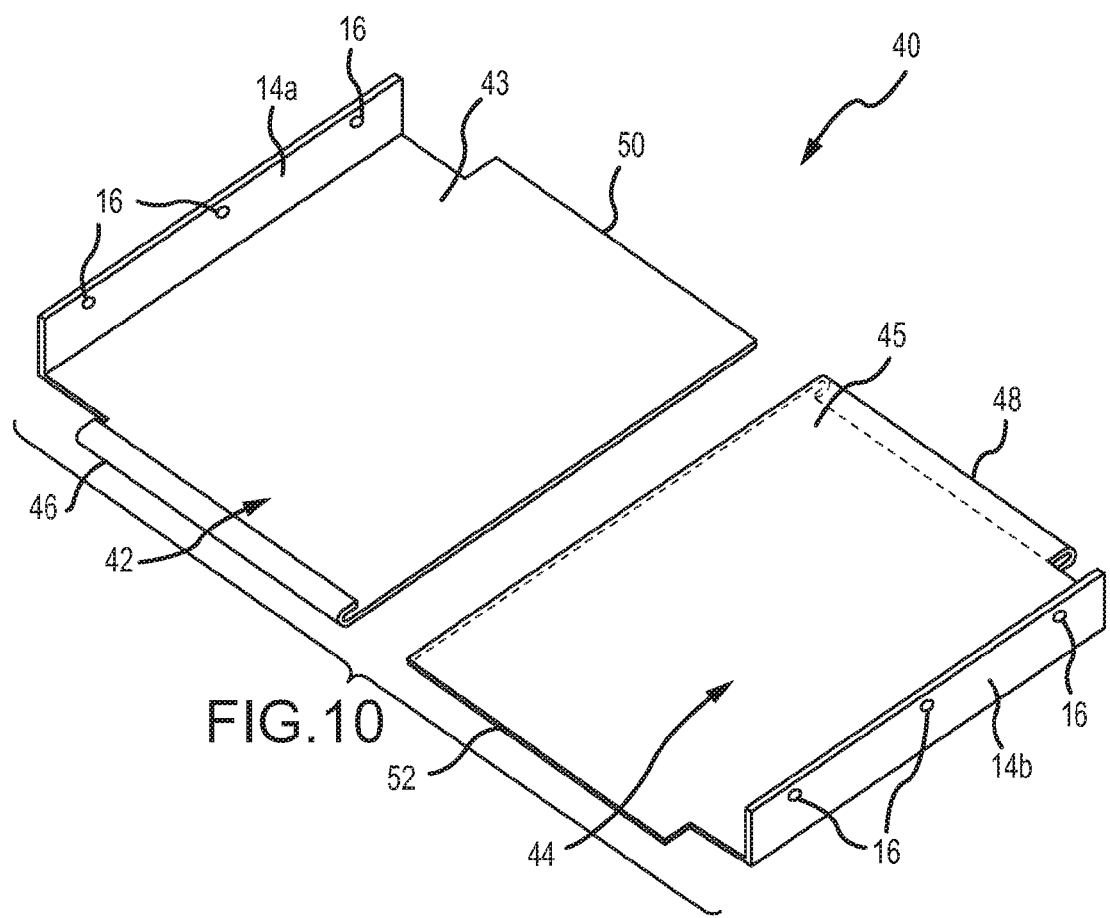

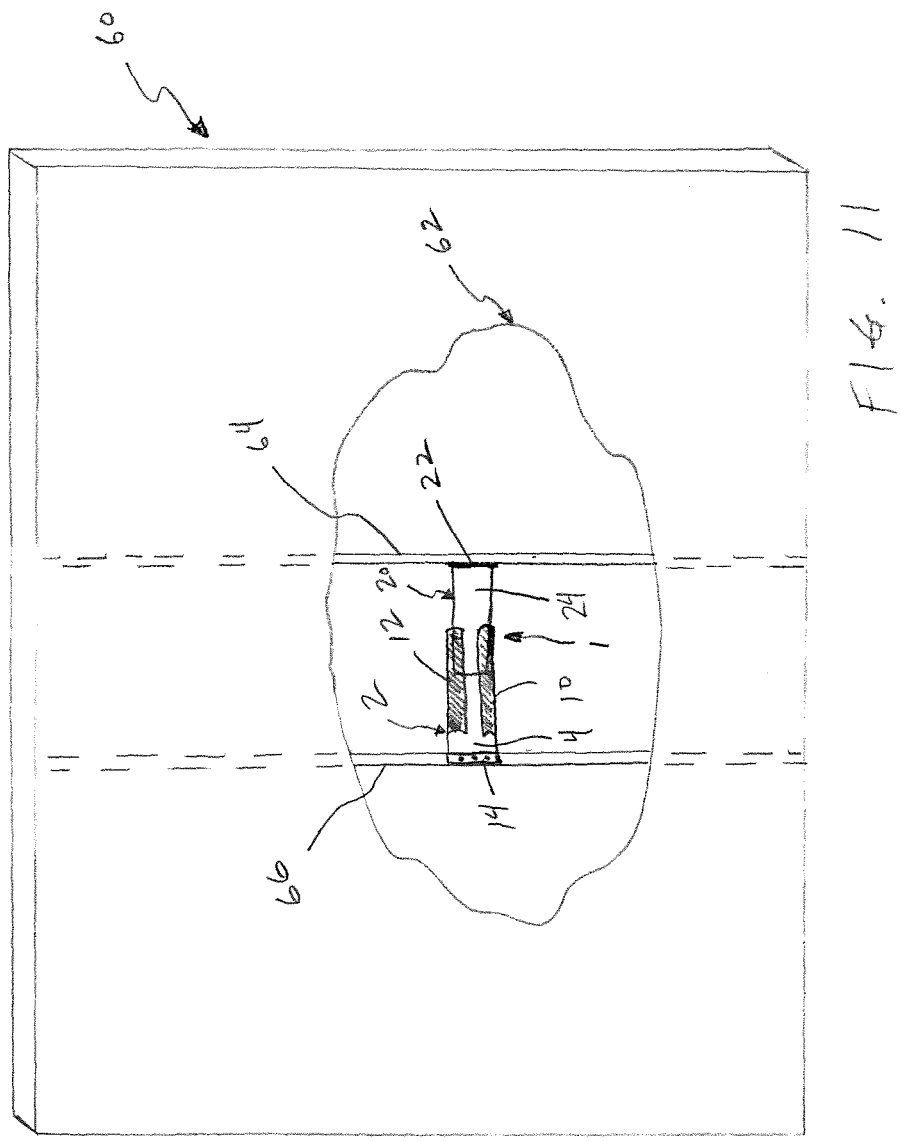

ADJUSTABLE MOUNTING BRACKET AND SUPPORT

This U.S. Non-Provisional Patent Application claims the benefit of priority from U.S. Provisional Patent Application Ser. No. 61/973,379, filed Apr. 1, 2014, the entire disclosure of which is hereby incorporated by reference in its entirety.

FIELD

Embodiments of the present disclosure relate generally to the field of brackets and support plates. Moreover, embodiments of the disclosure relate to a unique adjustable inner wall support for plumbing, handrails, electrical features such as boxes and outlets, ornamental features, shelving units, appurtenances and fixtures.

BACKGROUND

Various systems and devices exist for mounting or anchoring devices into drywall or wall panel features. Such features include, for example, drywall anchors that generally serve to increase the load a sheet of wall material is capable of supporting. Known systems and devices, however, fail to provide a support system that is adjustable and that extends between at least two preexisting studs in a wall panel to allow a user numerous options for mounting devices to or within a wall and where is not possible or desirable to connect or anchor directly into a wall stud.

SUMMARY

In view of the limitations now present in the prior art devices for plumbing handrails, electrical features, ornamental features, shelving units, appurtenances and fixture supports, generally referred to herein as supports, the present disclosure provides a new and useful adjustable support which is simpler in fabrication, more universally functional and more versatile in application and operation than known prior art methods or devices. Embodiments provided herein are suitable for receiving and mounting a number of devices and features, and no limitation with respect thereto is provided. For example, although preferred embodiments contemplate providing a mounting bracket for plumbing and fixture supports, embodiments of the present disclosure are also adapted to receive and support electrical features such as boxes and outlets, ornamental features, shelving units, and similar objects and features mounted on or in a wall unit.

In various embodiments, a new adjustable inner wall support is provided that may be used to securely attach and mount plumbing and bathroom related features in fixed positions. Embodiments of the present disclosure further provide adjustable supports comprising novel features not taught by the prior art. For example, assemblies of certain embodiments comprise a support that is adapted to fit between and/or securely mount to wall studs having varying distances therebetween, resulting in a new and novel inner wall support which is not apparent, obvious, or suggested, either directly or indirectly by any of the prior art devices, apparatus, or methods.

The assemblies described herein are preferably intended to be manufactured from sheet metal. It is to be understood that alternative embodiments may be manufactured from materials such as polymers or composites that allow devices provided herein to perform the same purpose and function.

Embodiments of the present disclosure are intended to be used between framing members of a building structure, such as a prefabricated bathroom structure. In such a structure, fastening, attaching, or mounting various components within the prefabricated bathroom environment to either the exterior or the interior of the wall structures in a safe and secure manner can be difficult because the structural framing members, or studs, are positioned within the walls at specific intervals based on the structural needs of the building and not on the location of specific components such as bath fixtures, mirrors, cabinets, plumbing. This may result in large spans between the studs or supports where there is either partial or no structural support for these components if they are intended to be installed or located between the studs.

In one embodiment, an adjustable bracket assembly for spanning a predetermined distance between support members of a wall structure is provided, the assembly comprising a first support member, the first support member comprising a first substantially planar portion having a first end, a second end, and a predetermined length therebetween. The first end comprises a first flange member extending substantially perpendicular to the first substantially planar portion, and the first flange member comprises a plurality of apertures for receiving fasteners. A first channel and a second channel extend along at least a portion of the length of the first substantially planar portion. A second support member is provided, the second support member comprising a second substantially planar portion and a second flange member, the second flange member extending substantially perpendicular to the second substantially planar portion and substantially parallel to the first flange portion. The second flange member is devoid of channels extending along a portion of the length of the second substantially planar portion. The second flange member comprises a plurality of apertures for receiving fasteners, and opposing edges of the second substantially planar portion are slidably received within the first channel and the second channel of the first support member such that a distance between the first flange member and the second flange member is selectively adjustable.

In another embodiment, an adjustable bracket assembly is provided for spanning a predetermined distance between support members of a wall structure, the assembly comprising a first support member and a second support member, the first support member and the second support member each comprising a substantially planar portion having a first end, a second end, and a predetermined length therebetween. The first end comprises a flange member extending substantially perpendicular to the substantially planar portion, the flange member comprises a plurality of apertures for receiving fasteners. A first channel and a second channel extend along at least a portion of the length of the substantially planar portion. A planar support member is also provided, the planar support member being devoid of flanges and channels and adapted to be received within said first channels and said second channels, and wherein opposing edges of the planar support member are slidably received within the channels such that an overall length of the adjustable bracket assembly may be adjusted.

In yet another embodiment, an adjustable bracket assembly for spanning a predetermined distance between support members of a wall structure is provided, the assembly comprising a first support member, the first support member comprising a first substantially planar portion having a first end, a second end, and a predetermined length therebetween. The first end comprises a first flange member extending substantially perpendicular to the first substantially planar portion, the first flange member comprising a plurality of apertures for receiving fasteners. A first channel extends along at least a portion of the length of the first substantially planar portion. A second support member is provided, the second support member comprising a second substantially planar portion having a first end, a second end, and a predetermined length therebetween. The first end of the second support member comprises a second flange member extending substantially perpendicular to the second substantially planar portion, the second flange member comprising a plurality of apertures for receiving fasteners. A second channel extends along at least a portion of the length of the second substantially planar portion, and the second support member is received by the first channel of the first support member, and the first support member is received by the second channel of the second support member.

The present disclosure provides a support device for provision within a wall, the device adapted to span between wall studs and will allow for fastening, attaching, and/or mounting various components within the prefabricated bathroom environment to either the exterior or the interior of the wall structures, in a safe and secure manner.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure and is not meant to limit the inventive concepts disclosed herein.

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1:
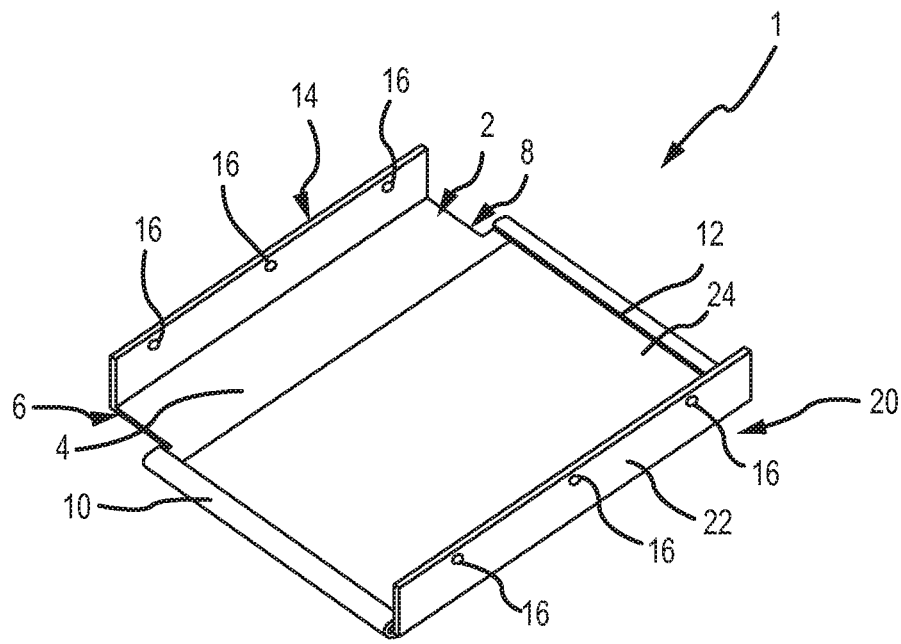

FIG. 1 is a perspective view of a fixture support according to one embodiment of the present disclosure.

Figure 2:
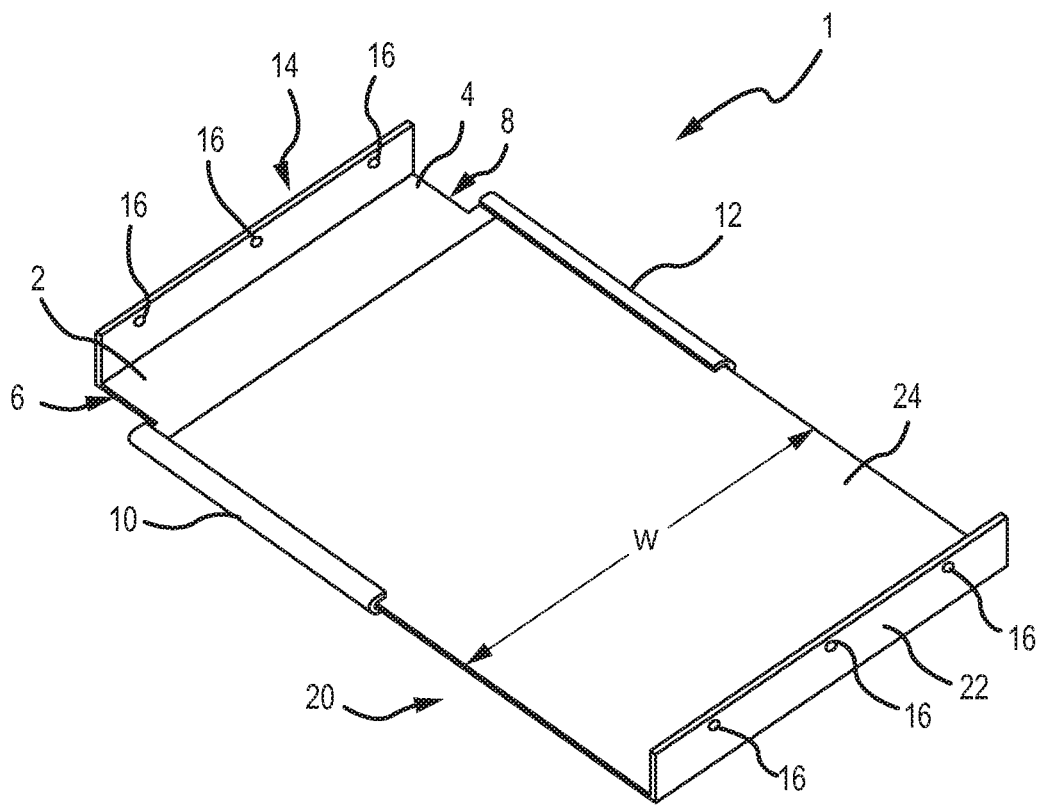

FIG. 2 is a perspective view of a fixture support according to one embodiment of the present disclosure.

FIG. 3 is a perspective view of a portion of a fixture support according to one embodiment of the present disclosure.

FIG. 4 is a top plan view of a portion of a fixture support according to one embodiment of the present disclosure.

Figure 5:
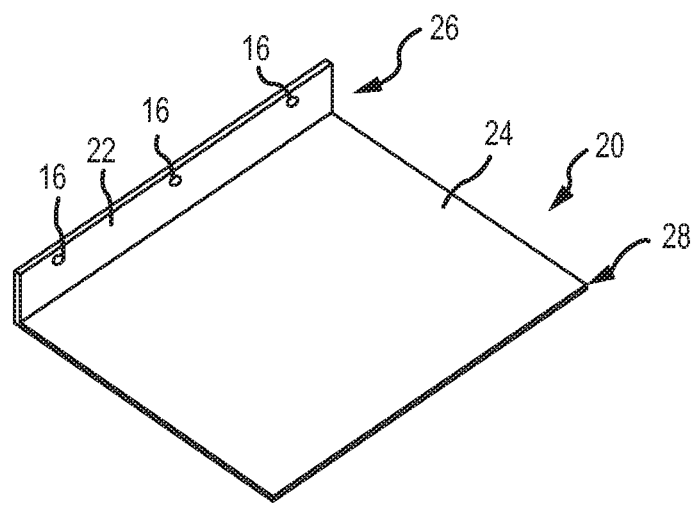

FIG. 5 is a perspective view of a portion of a fixture support according to one embodiment of the present disclosure.

Figure 6:
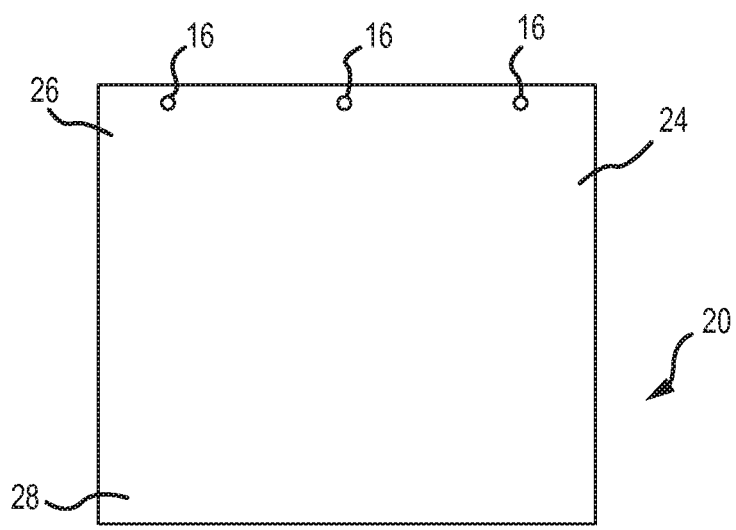

FIG. 6 is a plan view of a portion of a fixture support according to one embodiment of the present disclosure.

Figure 7:
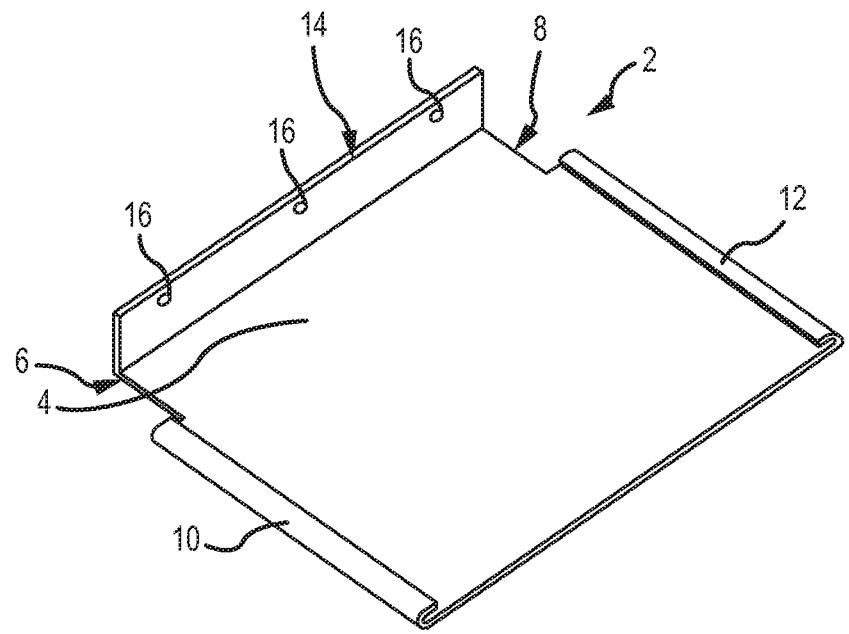

FIG. 7 is a perspective view of a portion of a fixture support according to one embodiment of the present disclosure.

Figure 8:
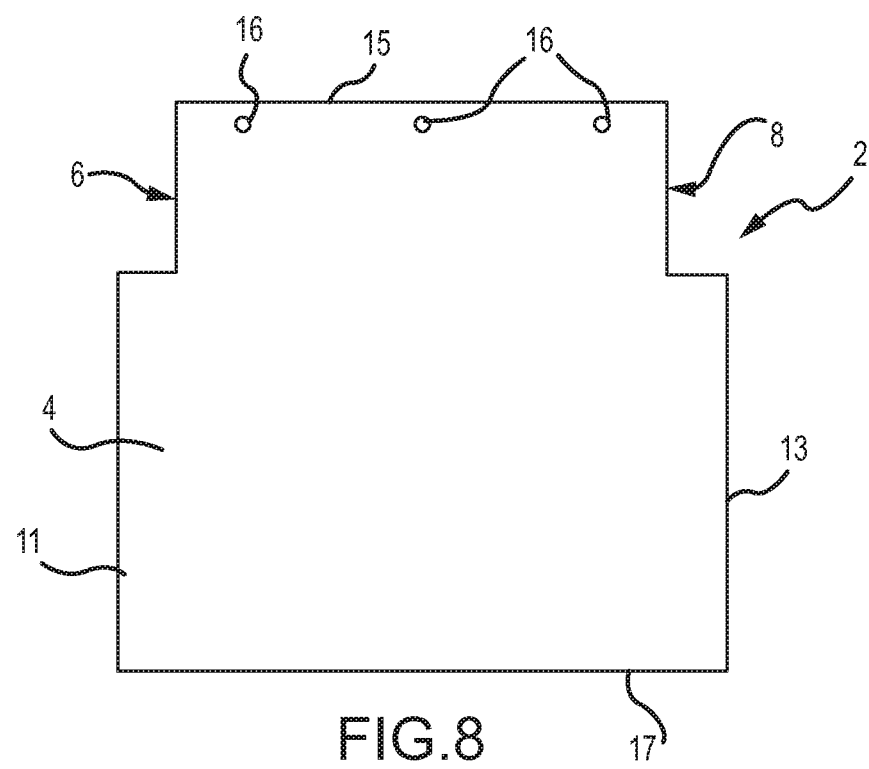

FIG. 8 is a plan view of a portion of a fixture support according to one embodiment of the present disclosure.

Figure 9:
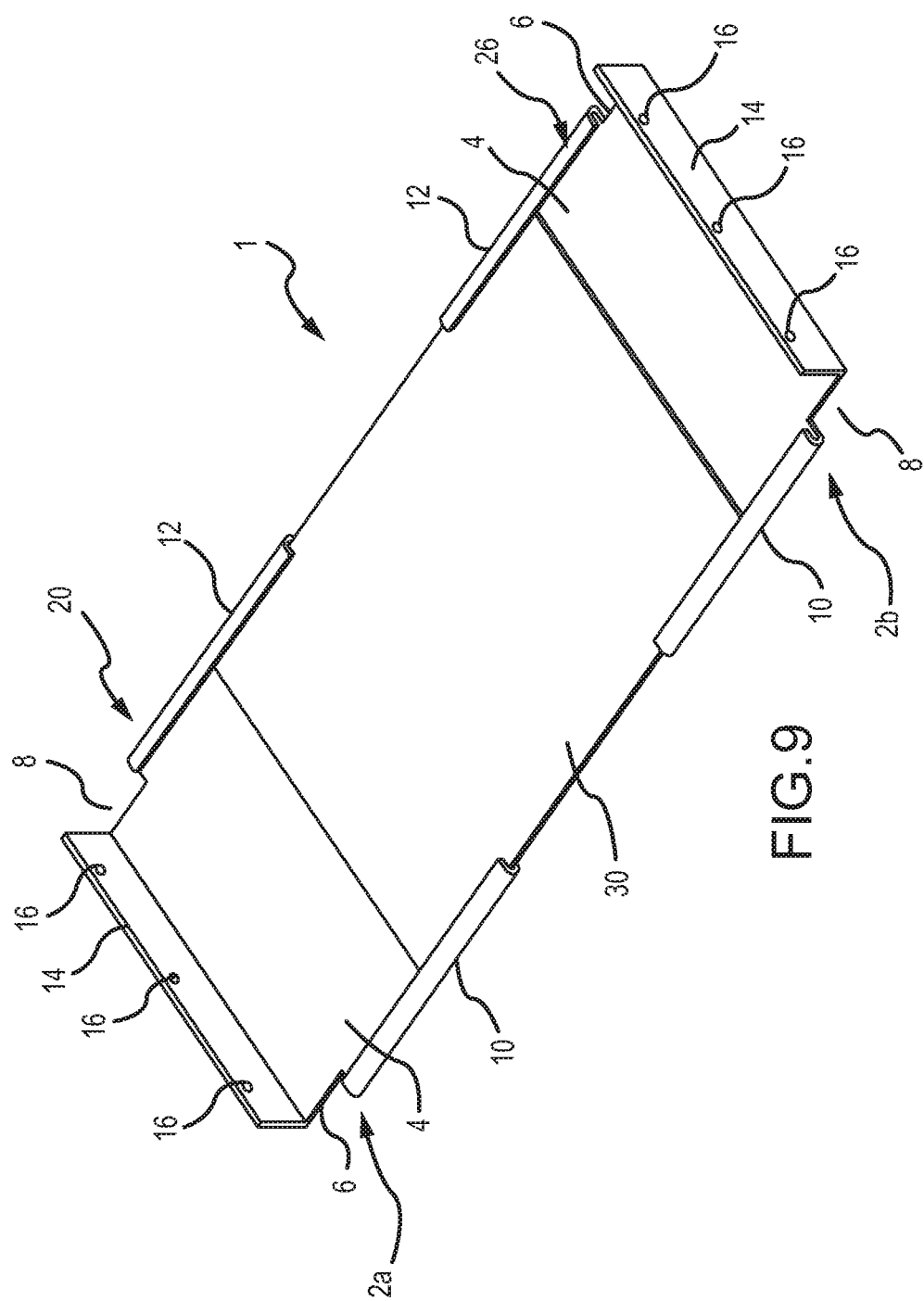

FIG. 9 is a perspective view of a fixture support according to one embodiment of the present disclosure.

FIG. 10 is a perspective view of a fixture support according to one embodiment of the present disclosure.

FIG. 11 is a perspective view of a wall panel provided with a fixtures support according to one embodiment of the present invention.

To further assist with the understanding of the disclosure, the following is a listing of elements provided in the drawings:

1 Support Assembly
2 First Support Panel
4 Substantially Planar Portion
6 First Notch
8 Second Notch
10 Channel
11 Lateral Portion
12 Channel
13 Lateral Portion
14 Flange Member
16 Aperture
17 Peripheral Edge
20 Second Support Panel
22 Flange Member
24 Substantially Planar Portion
26 First Peripheral Edge
28 Second Peripheral Edge
30 Central Support Panel
40 Support Assembly
42 First Support Member
43 First Substantially Planar Portion
44 Second Support Member
45 Second Substantially Planar Portion
46 First Channel
48 Second Channel
50 Opposing Edge
52 Edge
60 Wall Panel
62 Cut Out
64 Stud
66 Stud

DETAILED DESCRIPTION

In various embodiments, an inner wall support for supporting various features is provided. In a preferred embodiment, first and second support panels are provided. Referring now to FIGS. 1-2, a first support panel 2 comprises a generally rectangular shaped flat body with a planar portion 4. The first support panel 2 comprises first 6 and second 8 notches provided in opposing corners of the panel 2. The first support panel 2 further comprises first 10 and second 12 channels extending along at least a portion of the panel 2. The channels of FIG. 1 comprise generally C-shaped inward-facing channels 10, 12. The first support panel body 2 further comprises a flange member 14. The flange member 14 of FIG. 1 is preferably formed from the same sheet of material as the remainder of the panel 2 and comprises a bend or extension oriented substantially perpendicular to planar portion 4 of the panel 2. In various embodiments, the flange portion 14 comprises a length that is approximately one-sixth of the length of the planar portion. In various embodiments, the flange portion 14 comprises a plurality of holes or apertures 16. Although the flange 14 of FIG. 1 is shown as extending in one direction away from the panel 2, embodiments of the present disclosure comprise flanges that extend in two or more directions away from the panel 2.

As further shown in FIGS. 1-2, a second support panel 20 is provided. The second support panel 20 comprises a generally rectangular shaped flat body. As shown, the second support panel 20 comprises a flange portion 22 and a planar portion 24. The flange portion 22 is disposed substantially perpendicular to the planar portion 24 and extends along the width of the second planar portion 24. A height of the second flange portion 22 is approximately one-sixth of the length of the planar portion 24 of the second support panel 20. The second support panel 20 comprises a width W that is adapted to be received within the channels 10, 12 of the first support panel 2.

FIG. 3 is a perspective view of a second support panel 20 in isolation. As shown, the second support panel 20 comprises a substantially planar portion 24 with a flange member 22, the flange member 22 provided substantially perpendicular to the planar portion 24. The flange member 22 comprises a plurality of apertures 16 for receiving fasteners and securing the support 20 to a wall stud, support, or similar member, for example. Fasteners contemplated for use with certain embodiments include, but are not limited to screws, anchors, nails, etc. A first peripheral edge 26 is provided at a terminus of the flange member 22. A second peripheral edge 28 is provided at a terminus of the substantially planar portion 24.

FIG. 4 is a top plan view of a second support panel 20 according to one embodiment and prior to forming or bending of the flange portion. As shown, the support panel 20 comprises a substantially planar object with apertures 16 formed therein. The planar portion of FIG. 4 is ready for deformation or bending of the first end 26 to form the flange member 22.

FIGS. 5-6 depict a similar support element or panel as that shown in FIGS. 3-4 comprising different dimensions and proportions as that shown in FIGS. 3-4. One of skill in the art will recognize that support panels and assemblies of the present disclosure are not limited to specific dimensions or proportions, and various sized assemblies as may be desirable to fit certain applications are contemplated.

FIG. 7 depicts one embodiment of a first panel 2 according to one embodiment of the present disclosure. As shown, the panel 2 comprises a substantially planar portion 4, a flange member 14, and channel members 10, 12. The flange member 14 comprises a plurality of apertures 16 for securing the support to a stud or support, for example. FIG. 8 is a plan view of a planar portion of material, prior to being formed into the panel portion of FIG. 7. As shown, lateral portions 11, 13 are provided, which are subsequently rolled or folded into the C-shaped channels 10, 12 of FIG. 7. The panel 2 comprises a first peripheral edge 15 at a terminus of the flange member (14 in FIG. 7) and a second peripheral edge 17 at the terminus of the substantially planar portion 4.

In various embodiments, an adjustable support member is provided wherein a first support member 2 and a second support member 20 are slidable relative to each other. Specifically, a second support member 20 is slidable within channel members 10, 12 of the first member 2. Flange members 14, 22 are provided as a contact surface for a wall stud or support member to which the support members are to be attached. Supports of the present disclosure may be positioned towards the front or rear of the wall interior to accommodate piping such as conduit or plumbing within the walls. In other words, supports of the present disclosure may be provided at various depths along a stud or support and need not necessarily be provided flush against an interior surface of a wall or panel structure. In various embodiments, supports of the present disclosure accommodate piping and wiring by comprising the ability to be positioned at various locations in order to allow space for such features and/or secure piping, wiring, and other structures to the support(s).

Referring now to FIG. 9, an alternative embodiment of the disclosure is provided wherein a support assembly 1 comprises two support panels 2a, 2b, with central support panel 30 provided therebetween. The support panels 2a, 2b comprise the same or similar structure of the embodiment of FIGS. 1-2. The central support panel 30 is provided in the channels 10, 12 of each of the support panels 2a, 2b, wherein the central support panel 30 comprises a substantially flat rectangular sheet of material.

In various embodiments, the central support panel 30 in the form of a sheet is selectively securable to at least one of the two support panels 2a, 2b. In certain embodiments, the central support panel 30 comprises one or more apertures through which a fastener may be provided to secure the central support panel 30 to either or both of the support panels 2a, 2b. In certain embodiments, the central support panel 30 is provided such that it is not fixedly secured to either of the support panels 2a, 2b. Rather, the central support panel 30 is slidably inserted into the channels 10, 12 of the support panels 2a, 2b prior to installation of the support 1. In certain embodiments, the dimensions of the features and the channels 10, 12 are sufficient to prevent displacement of the central support panel 30 at least when the support 1 is installed by securing the flange members 14 to a support or stud.

FIG. 10 is a perspective view of a support bracket assembly 40 according to one embodiment of the disclosure. As shown, an adjustable support bracket assembly 40 is provided for spanning a predetermined distance between support members of a wall structure. The assembly 40 comprises a first support member 42, the first support member 42 comprising a first substantially planar portion 43 having a first end, a second end, and a predetermined length therebetween. The first end comprises a first flange member 14a extending substantially perpendicular to the first substantially planar portion 43, the first flange member comprising a plurality of apertures 16 for receiving fasteners. A first channel 46 extends along at least a portion of the length of the first substantially planar portion 43. A second support member 44 is provided, the second support member 44 comprising a second substantially planar portion 45 having a first end, a second end, and a predetermined length therebetween. The first end of the second support member 44 comprises a second flange member 14b extending substantially perpendicular to the second substantially planar portion 45, the second flange member comprising a plurality of apertures 16 for receiving fasteners, and a second channel 48 extending along at least a portion of the length of the second substantially planar portion 45. An edge 52 of the second support member 44 is received by the first channel 46 of the first support member 42, and an opposing edge 50 of the first support member 42 is received by the second channel 48 of the second support member 44.

FIG. 11 is a perspective view of a wall panel 60 comprising first 64 and second 66 studs between which a support assembly 1 according to one embodiment of the present invention is provided. As shown, the wall panel 60 of FIG. 11 comprises at least two studs 64, 66 which are rendered visible by a cut-out 62 provided for illustrative purposes only. As shown, a first flange 14 of a first support panel 2 is secured to a stud 66, and a second flange 22 of a second support member 20 is secured to an adjacent stud 64. The second support member 20 is slidably received within the first support member 2 by channels 10, 12, and the combined length of the members 2, 20 form a span or bridge between adjacent wall studs 64, 66. The support 1 of FIG. 11 thus provides a support surface or feature for mounting elements and devices at a location between the illustrated studs 64, 66, but with enhanced structural support at least as compared to mounting fixtures or devices to dry wall or other elements between studs. Elements, devices and fixtures to be mounted between studs include, but are not limited to, lighting elements, television and entertainment supports, bathroom fixtures, mirrors, vanities, artwork, shelving, cabinetry, and other devices that will be recognized by one of ordinary skill in the art.

The foregoing has outlined, in general, the intended use and function as well as the physical aspects of certain embodiments and is to serve as an aid to better understanding the inventions disclosed herein. In reference to such, there is to be a clear understanding that the present disclosure is not limited to the method or detail of construction, fabrication, material, or application of use described and illustrated herein. Any other variation of fabrication, use, or application should be considered apparent as an alternative embodiment of the present disclosure.

What is claimed is:

1. An adjustable bracket assembly for spanning a predetermined distance between support members of a wall structure, the assembly comprising:
    a first support member, the first support member comprising a first planar portion having a first end, a second end, and a predetermined length therebetween;
    the first end comprising a first flange member extending perpendicular to the first planar portion, the first flange member comprising a plurality of apertures for receiving fasteners;
    first and second inward-facing channels extending along at least a portion of the predetermined length of the first planar portion, the first and second inward-facing channels separated by a first width of the first support member;
    a second support member, the second support member comprising a second planar portion and a second flange member, the second flange member extending perpendicular to the second planar portion and parallel to the first flange portion;
    the second planar portion comprising a panel having a generally rectangular shaped flat body and being devoid of channels;
    the second flange member comprising a plurality of apertures for receiving fasteners;
    wherein the first support member comprises a first notch and a second notch, and wherein the first notch and the second notch comprise a transition between the first width and a second width, and wherein the first flange member comprises a width that is smaller than the first width of the first support member and a width of the second flange member of the second support member;
    wherein a width of the second support member is less than the first width of the first support member and opposing edges of the second planar portion are slidably received within the first and second inward-facing channels of the first support member such that a distance between the first flange member and the second flange member is selectively adjustable;
    wherein the first flange member and the second flange member are operable to be secured to first and second wall studs, respectively, wherein the first and second wall studs comprise parallel extending wall studs, the second support member being slidably received within the first and second inward-facing channels such that a combined length of the support members provides a span between the first and second wall studs to provide a support surface for mounting elements at at least one location between the first and second wall studs; and
    wherein the adjustable bracket assembly is operable to be concealed within a wall panel and to provide a support surface for mounting at least one of a lighting element, a television, a bathroom fixture, a mirror, a vanity, and a cabinet.

2. The adjustable bracket assembly of claim 1, wherein the at least one of a first channel and a second channel comprises an at least partially open channel.

3. The adjustable bracket assembly of claim 1, wherein at least of the first planar portion and the second planar portion comprises an aperture for receiving a fastener.

4. The adjustable bracket assembly of claim 1, wherein at least one of the first flange member and the second flange member comprises a planar surface adapted to contact a wall stud.

5. The adjustable bracket assembly of claim 1, wherein at least one of the first support member and the second support member comprise at least one of sheet metal, plastic, and fiber glass.

6. An adjustable bracket assembly for spanning a predetermined distance between support members of a wall structure, the assembly comprising:
    a first support member and a second support member, the first support member and the second support member each comprising a planar portion having a first end, a second end, and a predetermined length therebetween;
    the first end comprising a flange member extending perpendicular to the planar portion, the flange member comprising a plurality of apertures for receiving fasteners;
    a first channel and a second channel extending along at least a portion of the length of the planar portion of the first support member;
    the second support member comprising a planar support member, the planar support member being devoid of apertures, flanges and channels and adapted to be received within said first channel and said second channel, and wherein opposing edges of the planar support member are slidably received within the channels such that an overall length of the adjustable bracket assembly may be adjusted;
    wherein the first support member comprises a first notch and a second notch, and wherein the first notch and the second notch comprise a transition between a first width and a second width of the first support member, and wherein the flange member of the first support member comprises a width that is smaller than the first width of the first support member and a width of the flange member of the second support member;
    wherein the flange members are operable to be secured to first and second wall studs, respectively, wherein the first and second wall studs comprise parallel extending wall studs, the second support member being slidably received within the first and second channels such that a combined length of the support members provides a span between the first and second wall studs to provide a support surface for mounting elements at at least one location between the first and second wall studs; and
    wherein the adjustable bracket assembly is operable to be concealed within a wall panel.

7. The adjustable bracket assembly of claim 6, wherein the support members comprise a first width and the planar support member comprises a second width, the first width being greater than the second width.

8. The adjustable bracket assembly of claim 6, wherein at least one of the first channel and the second channel comprises an at least partially open channel.

9. The adjustable bracket assembly of claim 6, wherein at least of the planar portions comprises an aperture for receiving a fastener.

10. The adjustable bracket assembly of claim 6, wherein the flange member comprises a planar surface adapted to contact a wall stud.

11. The adjustable bracket assembly of claim 6, wherein at least one of the first support member, the second support member, and the planar support member comprise at least one of sheet metal, plastic, and fiber glass.

12. An adjustable bracket assembly for spanning a predetermined distance between support members of a wall structure, the assembly comprising:
    a first support member, the first support member comprising a first planar portion having a first end, a second end, and a predetermined length therebetween;
    the first end comprising a first flange member extending perpendicular to the first planar portion, the first flange member operable to be secured to a first wall stud and comprising a plurality of apertures for receiving fasteners;
    a first channel extending along at least a portion of the length of the first planar portion;
    a second support member, the second support member comprising a second planar portion having a first end, a second end, and a predetermined length therebetween;
    the first end of the second support member comprising a second flange member extending perpendicular to the second planar portion, the second flange member operable to be secured to a second wall stud that is provided parallel and adjacent to the first wall stud, the second flange member comprising a plurality of apertures for receiving fasteners;
    a second channel extending along at least a portion of the length of the second planar portion;
    wherein the second support member is received by the first channel of the first support member, and the first support member is received by the second channel of the second support member, and the first and second support members are slidable with respect to one another such that a combined length of the support members provides a span between adjacent first and second wall studs that is operable for mounting an element at at least one location between the first and second wall studs with enhanced structural support; and
    wherein the first support member comprises a first notch and a second notch, and wherein the first notch and the second notch comprise a transition between a first width and a second width of the first support member, and wherein the first flange member comprises a width that is smaller than the first width of the first support member and a width of the second flange member.

13. The adjustable bracket assembly of claim 12, wherein the first channel and the second channel are provided in opposing relationship.

14. The adjustable bracket assembly of claim 12, wherein at least one of the first channel and the second channel comprises an at least partially open channel.

15. The adjustable bracket assembly of claim 12, wherein at least of the planar portions comprises an aperture for receiving a fastener.

16. The adjustable bracket assembly of claim 12, at least one of the first flange member and the second flange member comprises a flat surface adapted to contact a wall stud.

17. The adjustable bracket assembly of claim 12, wherein at least one of the first support member and the second support member comprise at least one of sheet metal, plastic, and fiber glass.

18. The adjustable bracket assembly of claim 12, wherein the second flange member comprises a height that is approximately one-sixth of the predetermined length of the second substantially planar portion.

* * * * *